United States Patent [19]

Monsen

[11] 3,879,664

[45] Apr. 22, 1975

[54] HIGH SPEED DIGITAL COMMUNICATION RECEIVER

[75] Inventor: Peter Monsen, Stow, Mass.

[73] Assignee: Signatron, Inc., Lexington, Mass.

[22] Filed: May 7, 1973

[21] Appl. No.: 357,675

[52] U.S. Cl. .................. 325/303; 325/305; 325/321

[51] Int. Cl. .............................................. H04b 1/16

[58] Field of Search ........... 325/41, 42, 56, 65, 321, 325/301–306; 179/15 AE, 15 BV; 333/18

[56] References Cited

UNITED STATES PATENTS

| | | | |
|---|---|---|---|
| 3,548,309 | 12/1970 | Saltzberg et al. | 179/15 BV |
| 3,560,855 | 2/1971 | Schroeder | 325/42 |
| 3,633,107 | 1/1972 | Brady | 325/305 |
| 3,648,171 | 3/1972 | Hirsch | 325/42 |
| 3,715,670 | 2/1973 | Hirsch et al. | 325/42 |
| 3,757,221 | 9/1973 | Moehrmann | 325/42 |

*Primary Examiner*—Benedict V. Safourek
*Assistant Examiner*—Jin F. Ng
*Attorney, Agent, or Firm*—Dike, Bronstein, Roberts, Cushman & Pfund

[57] ABSTRACT

A high speed digital communications receiver is used in a diversity receiver system in which the predetection combiner of the receiver utilizes a forward adaptive filter equalizer, having a plurality of weighting sections, in each of the diversity channels for processing each of the received bandpass diversity signals prior to demodulation. The combined weighted output signal from the predetection combiner is then demodulated and the data therein appropriately reconstructed and an error signal generated. The error signal is modulated and limited for use in adaptive control circuitry which provides appropriate adaptive weighting signals for use in the processing of the received diversity signals at each of the forward filter equalizers. The unmodulated error signal is used in a backward adaptation control circuit for providing appropriate adaptive weighting signals for use in a single backward filter equalizer which suitably processes the reconstructed data to form a cancellation signal which is used to eliminate intersymbol interference and source correlation effects in the demodulated combined weighted output signal. A novel adaptive timing system is disclosed which permits the receiver clock to follow transmitter clock variations. Further, a novel automatic gain control system at the input IF receiver amplifiers is used to reduce the dynamic range requirements of the forward filter weight components.

23 Claims, 14 Drawing Figures

HIGH SPEED DIGITAL COMMUNICATION RECEIVER

INTRODUCTION

This invention relates generally to communications systems and, more particularly, to communications system receivers for use in receiving signals which have been transmitted through a dispersive transmission medium, such as a fading multipath medium.

BACKGROUND OF THE INVENTION

In multipath transmission systems, such as those which utilize troposcatter communication links, for example, the transmitted signal is conveyed through the multipath medium along a plurality of paths of differing lengths so that a plurality of signals, each representing the transmitted signal but having varying energy contents, are received at the receiver at different times depending on the length of each particular transmission path in the medium. One of the techniques used in overcoming the problem of fading in such communication systems is the use of the diversity principle under which it is assumed that each of the several multipath channels conveying a given signal has independent fading characteristics. Accordingly, a plurality of diversity receivers are used and one or more of the diversity receiver channel signals having the greatest signal strengths are selected as most probably carrying a reliably detectable message signal. In approach, diversity appraoch, a composite signal is generated from a combination of all of the received diversity channel signals. In the latter case the diversity channel signals may be appropriately weighted before they are combined. A suitable signal processing technique which has heretofore been utilized in providing appropriate signal weights has been based on a mean-square error criterion, particularly with the transmission of digital data, the weighting factors being utilized to equalize the multipath distortion and to substantially remove any timing jitter.

DISCUSSION OF THE PRIOR ART

One diversity channel receiver system which has been suggested in the prior art is described in U.S. Pat. No. 3,633,107 issued on Jan. 4, 1972 to D. M. Brady. As described in the Brady patent, a signal processor in the diversity receiver performs the functions of demodulation, diversity signal combining, delay equalization, multipath distortion equalization and timing jitter elimination. Such receiver utilizes transversal filter equalizers, one such filter equalizer being used to process the demodulated received signal in each diversity channel, which filter equalizers are made adaptive to a common time-varying, mean-square error signal which is derived from the combined post detection output data.

In accordance therewith, each transversal filter equalizer has a plurality of taps spaced at not more than the data symbol interval and a plurality of weighting attenuators, one at each of said taps, together with means for combining the weighted output from all the equalizers in each of the channels. An error signal is derived from the combined weighted output and from the quantization of such combined weighted output, the error signal being thereupon correlated with each tap output to control the individual attenuator weights which are operative at each associated tap. In the system of the Brady patent the transversal filter equalizers process the demodulated receiver input signals and, as a result, a relatively large number of taps are required in each of said equalizers in order to achieve the desired operation. The implementation of such filter equalizers becomes relatively complex and expensive, if the desired performance is to be achieved. Moreover, the utilization of a large number of taps in each filter equalizer tends to increase the adaptation noise margins and implementation degradations.

Further, in the control loop for providing the appropriate tap weights in the Brady system, the multiplier design is very critical because the presence of a d-c offset when the error signal is zero, or small, leads to an inoperative condition particularly when a large number of taps are utilized.

Moreover, the system shown in the Brady patent does not disclose a suitable timing apparatus but rather assumes a synchronous clock without disclosing how such clock can suitably be synchronized in any suitable manner.

In addition, the system shown in the Brady patent does not disclose an automatic gain control system capable of reducing the dynamic range requirements of the forward filter weight components.

It has been suggested that the disadvantages of the system shown in the Brady patent can be overcome by using a backward transverse filter equalizer which operates on the reconstructed data signal. The backward filter equalizer is used in addition to the filter equalizers which operate on the received signal in the forward path. Such a system is broadly discussed in the article "Feedback Equalization for Fading Dispersive Channels", P. Monsen, IEEE Transactions on Information Theory, Vol. IT-17, No. 1, January 1971, which article was based on the author's doctorial thesis "Linear Equalization for Digital Transmission over Noisy Dispersive Channels" submitted in June 1970 to Columbia University, New York, N.Y. While the theory of the system suggested in the article and thesis discusses broadly the use of both forward and backward transversal filters, little or no information is disclosed to teach the art how to best implement such a system to obtain maximum advantage of the backward filter concept, nor does such article disclose any suitable timing means for providing the desired operation of the overall system.

The use of backward filters has also been discussed in other contexts, such as depicted in U.S. Pat. No. 1,717,116, issued on June 11, 1929, to J. W. Milnor and in U.S. Pat. No. 2,056,284, issued on October 6, 1936, to L. A. MacColl. Such patents merely show the use of fixed, or non-adaptive, backward filters in a cable system at baseband frequency, with no suggestion of a use at r-f frequencies or a use in any adaptive manner. The systems disclosed by Milnor and MacColl use such filters to cancel the tail of the impulse response to eliminate past digit symbol interference and, furthermore, no suggestion is found therein for use in combination with forward filter equalizers.

DESCRIPTION OF THE INVENTION

This invention represents an effective and novel implementation of a backward filter system broadly disclosed in the above mentioned article and thesis and provides a system operative under all conditions, even with a small error signal. The system is substantially easier and less costly to implement than that shown in the Brady patent and yet better performance results from the proposed invention. In accordance therewith, the invention uses a plurality of forward adaptive transversal filter equalizers in the predetection combiner circuitry of each of the diversity receiver channels, each of said filter equalizers in all cases operating upon the received signals at bandpass frequencies prior to any demodulation thereof. The use of predetection combiner equalizers at bandpass frequency rather than at the demodulated, or baseband, frequency is not disclosed in the above-mentioned, or in any other known, prior art and in fact the Brady system specifically requires that the forward adaptive filter equalizers operate on the post-demodulated signal. The use of premodulation equalization considerably eases the design of the weight adaptation controller and virtually eliminates any signal offset problems therein, as discussed in more detail below.

As used herein the term bandpass signal is defined as a signal whose bandwidth is much less than its center frequency. All other signals, e.g., a signal whose bandwidth is greater than its center frequency, are referred to as a baseband signal.

The backward adaptive transversal filter equalizer of the invention is utilized at baseband to provide a cancellation signal for eliminating the intersymbol interference from the demodulated weighted output signal obtained from the predetection combiner circuitry. The weighting sections of the backward filter are controlled by an appropriate weight adaptation controller which suitably processes the unmodulated error signal and the data output signal to control the individual attenuator weights operating each of the weighting sections thereof. It has been found that the use of such a backward filter processing technique in combination with the pre-demodulation forward filter processing technique significantly reduces the number of predetection weighting sections which are required in systems, such as the Brady system, using forward transversal filter equalizers for post-demodulation processing without any backward filter equalizer. Accordingly, an improved performance at lower implementation costs can be realized.

Further, unlike the prior art, an automatic gain control (AGC) system is used at the receiver input which provides a common gain control signal to all IF amplifiers, this gain being derived from the strongest IF signal. Such a system is a first order approximation to the optimum forward filter weights and thus greatly reduces their dynamic range requirements. The AGC and equalization systems are made noninteractive by selecting the system time constants to be widely separated, i.e., the AGC system operates much more slowly than the equalization system.

Further, the invention uses a novel adaptive timing system not shown in any of the prior art.

The system of the invention can be described in more detail with the assistance of accompanying drawings wherein FIG. 1 is an overall block diagram of a preferred embodiment of the receiver system of the invention;

Figure 1:
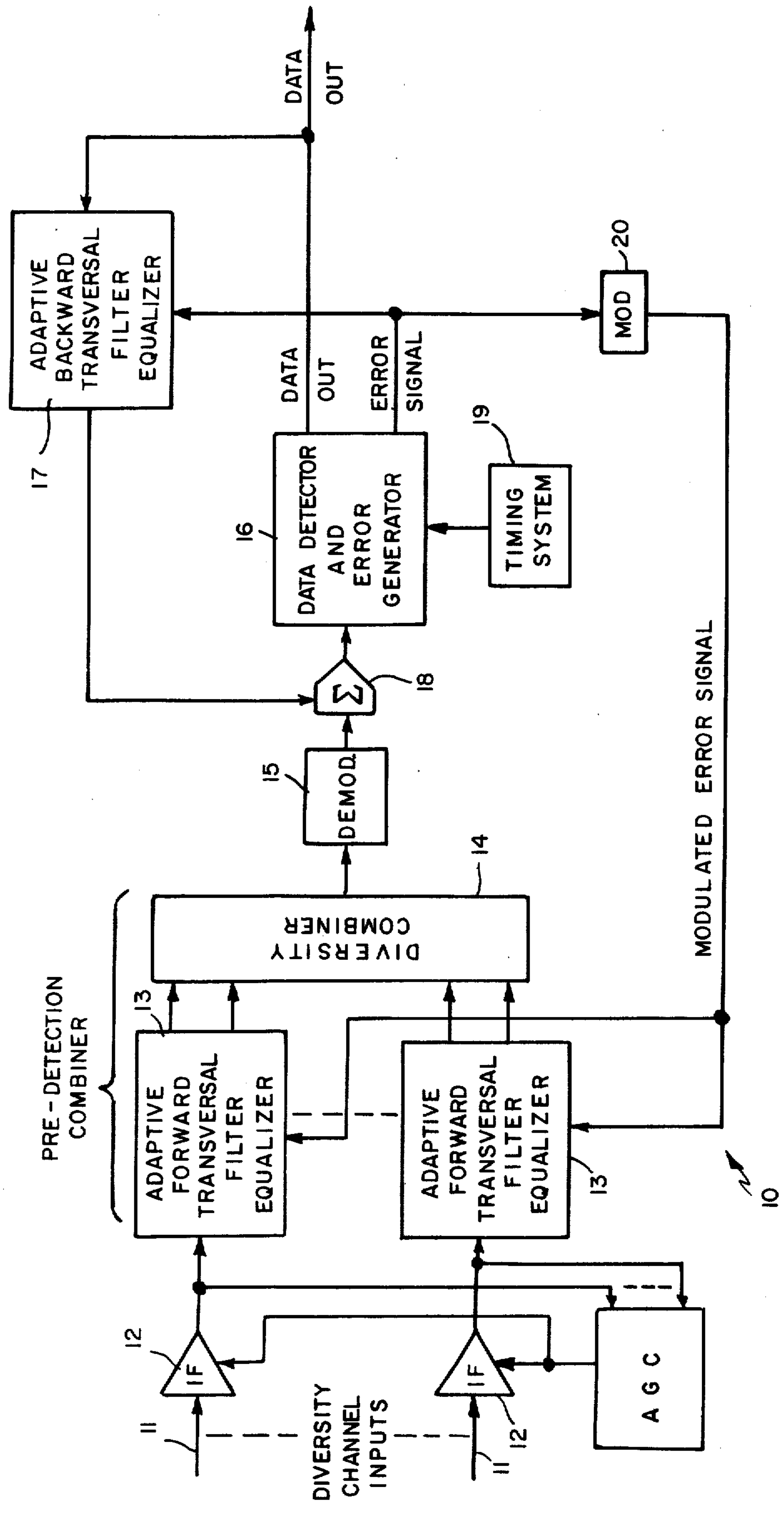

FIG. 1 depicts an overall block diagram of the system of the invention. As can be seen therein a plurality of diversity signals which have been received by a plurality of antennae (not shown), as in the manner shown in the above-mentioned Brady patent, are provided on receiver lines 11, two of which are shown in the figure. The plurality of received signals are the result of the transmission of a data signal from an appropriate transmitter (not shown) through a dispersive medium, for example as in a troposcatter medium, as explained in the Brady patent. The incoming diversity channel input signals are conveyed to suitable receiver IF amplifiers 12 using automatic gain control. The purpose of the IF amplification is to set the received signal levels within the dynamic range of the predetection combiner through the use of an AGC system which fixes all the IF amplifier gains according to the strongest of the received signals. Thus, the AGC subsystem envelope detects the output of each of the IF amplifiers 12 at envelope detectors 110 and selects the largest output therefrom at amplitude selector circuitry 111 which is then provided as the gain control signal to each IF amplifier. The time constant of the AGC system is arranged to be about 0.1 seconds, approximately equal to the faster atmospheric fluctuations, and permits a smoothing of the power fading characteristics of the incoming signals (the equalization time constant is typically 0.001 sec. thus preventing any interaction of these two systems). The strongest signal delivered to the predetection combining circuitry will then have approximately a constant level and the gain control circuitry reduces the dynamic range requirements of the predetection combiner.

In each channel, the IF amplifier output signal is fed to an adaptive forward transversal filter equalizer 13 which are made adaptive to a common modulated error signal derived from the data output signal in a manner discussed in more detail below. The transversal filter equalizers thereby provide a plurality of appropriately weighted signals from each channel which are subsequently combined in suitable combining circuitry 14. The predetection combiner circuitry operates to provide forward filter equalization, eliminates time jitter, establishes correct phase relationships for coherent detection and optimally combines the diversity channels. Moreover, the combiner provides an implicit diversity effect by coherently recombining the multipath structure.

It should be noted that unlike the system shown in the Brady patent the forward adaptive filter equalizers operate on the incoming signal prior to its demodulation and so do not operate at the baseband frequency as in Brady. Accordingly, the demodulation of the weighted signals occurs after the summation thereof in diversity combiner 14. The demodulator signal is fed to an appropriate data detector and error generator 16 which provides a common error signal at baseband frequency which signal must then be modulated by modulator 20 to provide the error signal used in connection with the transversal filter equalizers in the forward path. The data output and unmodulated error signal are utilized in an adaptive backward transversal filter equalizer 17 which provides a cancellation signal which is combined with the weighted demodulated output signal in combining network 18 for eliminating intersymbol interference and source correlation effects from such demodulated signal prior to the data detection and error generation process.

A suitable timing system described in more detail later is utilized to provide the appropriate timing required in the detection and error generation process.

A detailed description of the elements shown in FIG. 1 and the operation thereof is discussed with reference to FIGS. 2–9.

Figures 2, 2A:
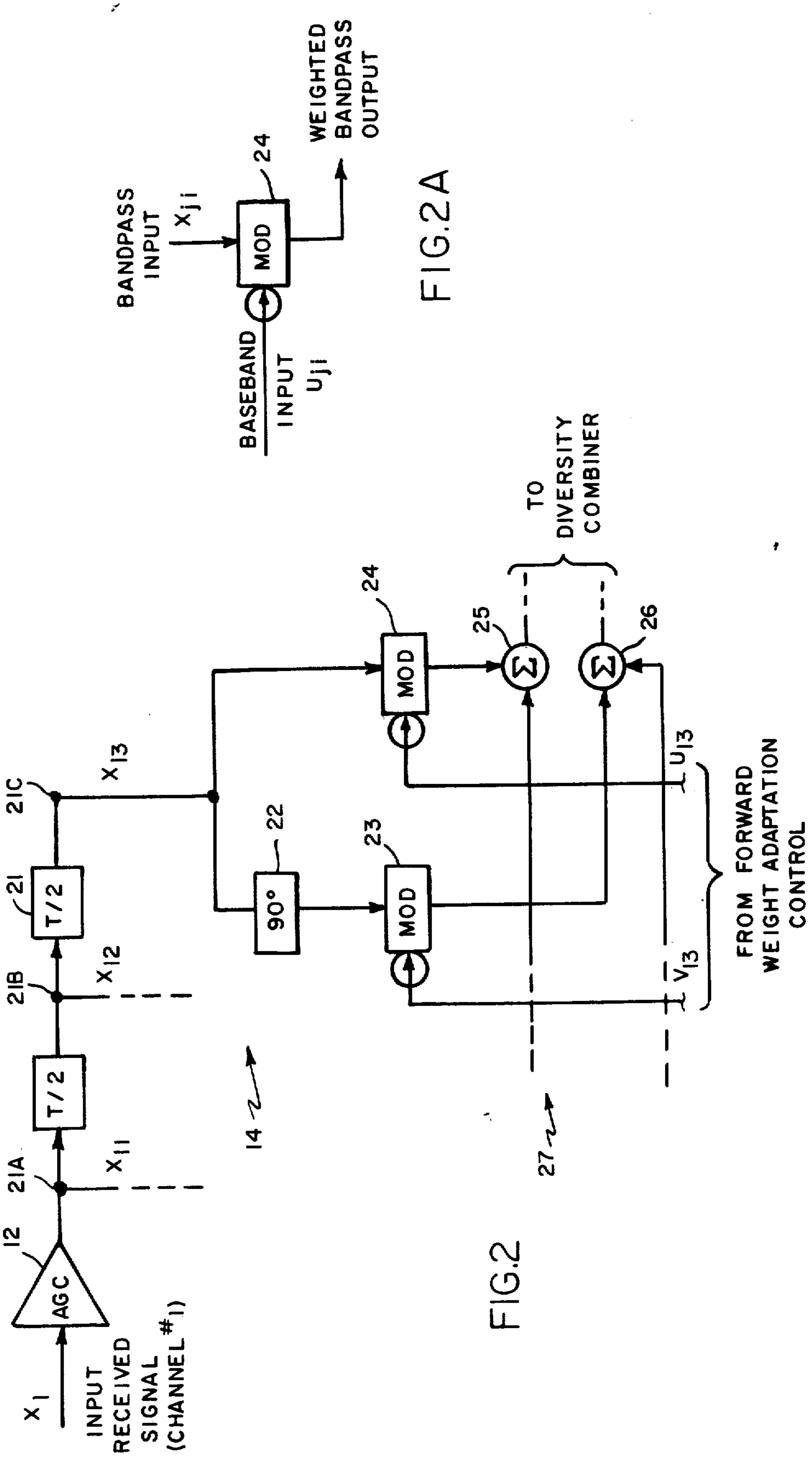
FIGS. 2 and 2A are block diagrams of a portion of the predetection combiner portion of the system of FIG. 1.
Figures 6, 7:
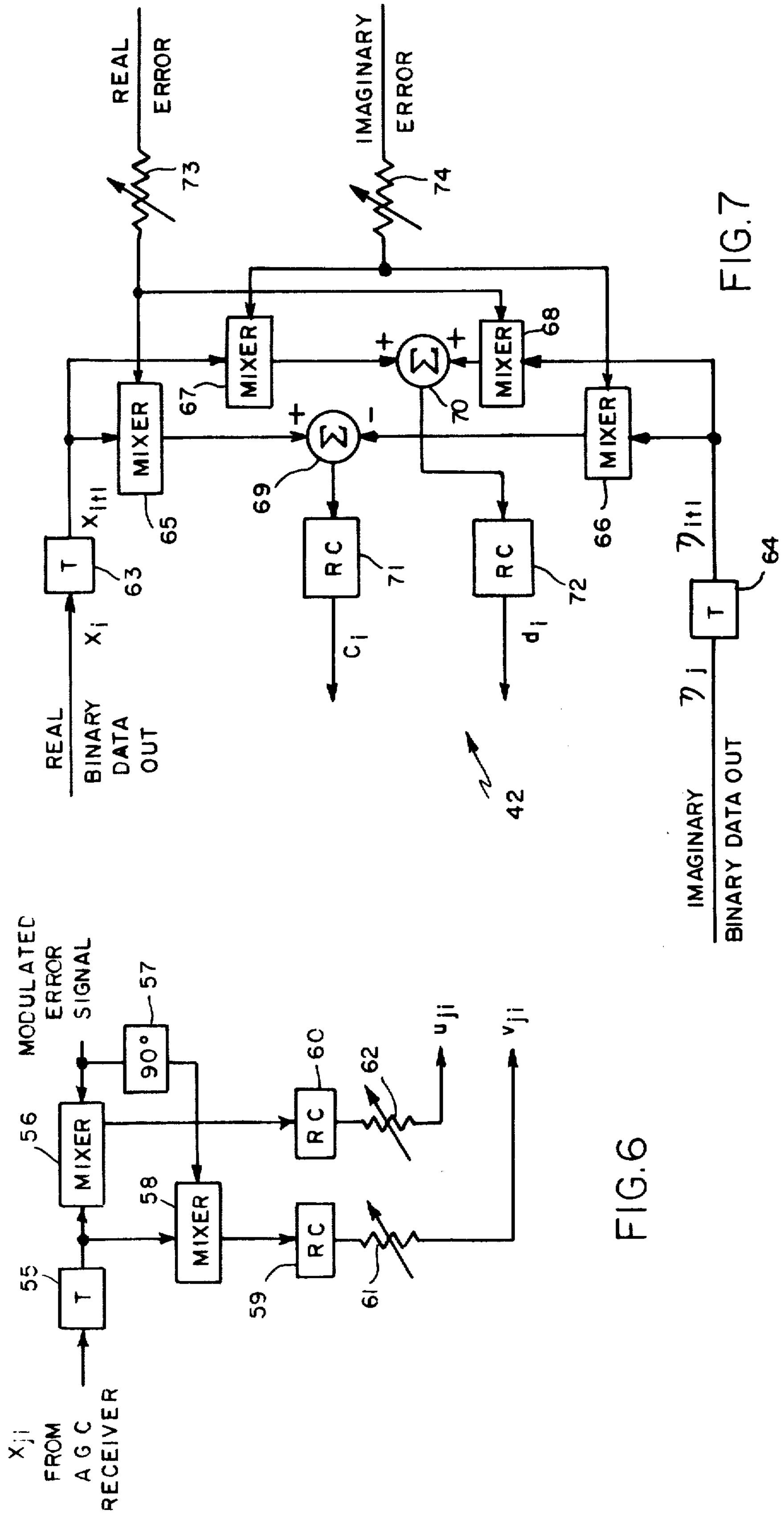
FIG. 6 is a more detailed block diagram of the weight adaptation control portion for use with the transversal filter equalizers of the predetection combiner portion of the system of the invention.
FIG. 7 is a more detailed block diagram of the weight adaptation control unit used to control the feedback transversal filter equalizer of the system of the invention of FIG. 1.

FIG. 2 shows a block diagram of the transversal filter equalizer the operation of which is controlled by appropriate control signals from a forward weight adaptation controller shown in more detail in FIG. 6. The diagram shown in FIG. 2 relates solely to a single diversity channel and it is clear that similar circuitry is utilized in each of the other diversity channels of the overall system.

As can be seen in FIG. 2 the input received signal is appropriately amplified through automatic gain control IF amplifier 12 as discussed above and is thereupon fed to a plurality of weighting sections which are spaced, in the preferred embodiment shown, at one-half the data symbol interval, T/2. It is understood that although the taps thereof are spaced at T/2 they may not in all applications be spaced exactly at such point, so long as they are spaced at intervals not more than the data symbol interval T. In the preferred embodiment, T/2 is close to the Nyquist interval which means that the transversal filter then operates as an approximation to a continuous band-limited filter. The filter is shown as having three weighting sections which is found to provide excellent performance with a minimum of implementation complexity. Each of the taps 21A, 21B and 21C provide the received signal at the appropriate tapped interval, such signals being denoted in the figure as $X_{11}$, $X_{12}$ and $X_{13}$. Both cophase and quadrature-phase weighting is required in each weighting section and each section produces a pair of weighted signals for diversity combiner 14 as shown with reference to weighting network 27 in connection with the weighting section processing receiver input signal $X_{13}$ spaced at a total interval equal to the data symbol interval T with reference to signal $X_{11}$. Thus, the weighted output signals to the diversity combiner comprise both real and imaginary parts and, accordingly, signal $X_{13}$ is processed to produce its real and imaginary components, the real component being fed directly to modulator 24 and the imaginary component being fed to modulator 23 through an appropriate 90° phase shifter 22. The real and imaginary weighted output signals are obtained at the outputs of modulators 23 and 24 after having been appropriately modulated (i.e., weighted) by the input weighting signals from the forward weight adaptation control unit. For the weighting section 27 discussed specifically in FIG. 2, such signals are identified as $u_{13}$, used to weight the real component of $X_{13}$, and $v_{13}$, used to weight the imaginary component thereof.

The notation used with respect to the modulator shows the incoming weighting signals applied to the modulator symbolically as requiring an arrowhead enclosed in a circle. Such notation is utilized to indicate that such weighting signal input is at the baseband frequency while the receiver signal inputs are at the bandpass frequency of the incoming signal. Such operation is depicted more generally in FIG. 2A wherein the bandpass input signal $X_{ji}$ represents one input to the modulator and the modulating input (i.e., the weighting input signal) $u_{ji}$ is supplied as a baseband input signal. The output of the modulator then represents the appropriate weighted bandpass output signal for feeding to the diversity summer.

Figure 3:
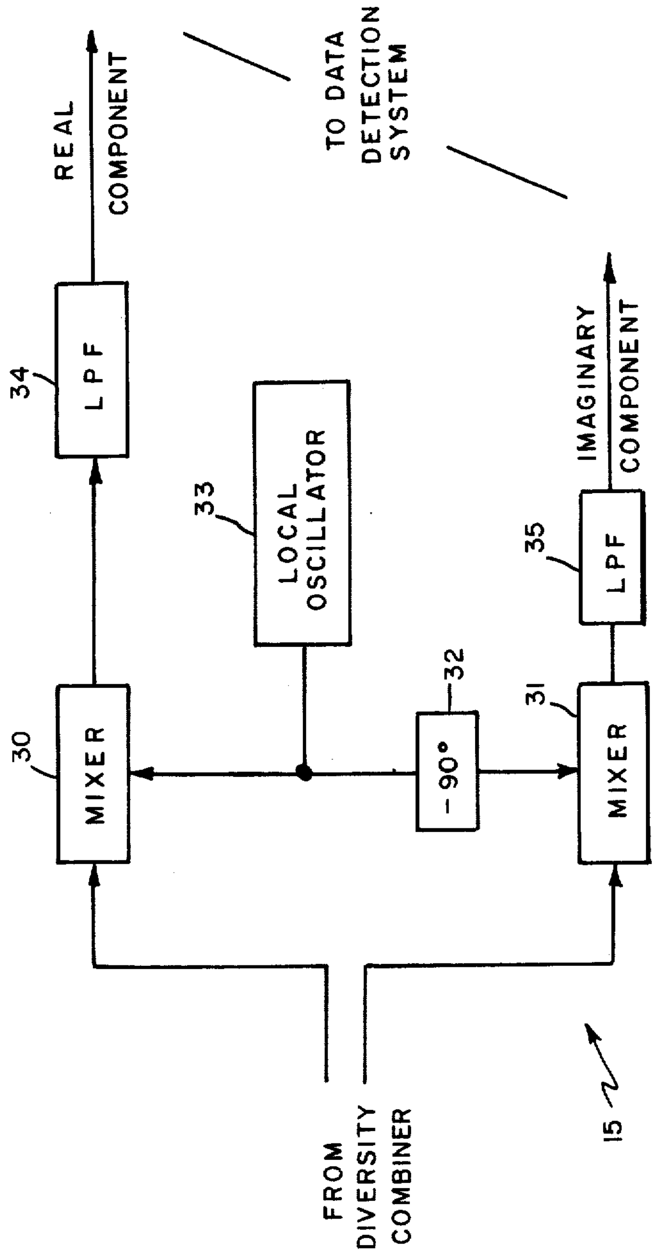
FIGS. 3 and 3A are block diagrams of the demodulator portion of the system of FIG. 1.
Figure 3A:
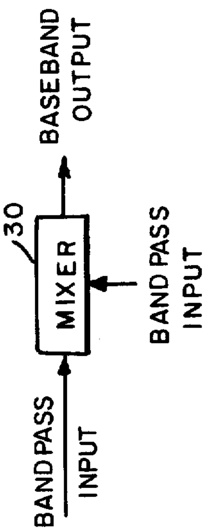

The real and imaginary weighted output signal from each of the other weighting sections in this diversity channel shown are progressively summed, as shown by summation circuits 25 and 26, respectively, and the overall summed signals are then fed to the diversity combiner. In addition the summed signals from each of the other transversal filter equalizers in each of the other diversity channels are obtained in essentially the same manner and provide suitable real and imaginary weighted output signals for feeding to the diversity combiner as shown in FIG. 1. The overall signal at the output of the diversity combiner is then appropriately demodulated by demodulator 15 as shown in FIG. 3. The real imaginary components are fed to mixers 30 and 31, respectively, where they are, in effect, heterodyned with an appropriate signal from a local oscillator 33. Thus, the output of the local oscillator is fed directly to mixer 30 and is fed to mixer 31 through a suitable 90° phase shift circuit 32. The heterodyned output signal from mixers 30 and 31 are then fed through low pass filters 34 and 35, respectively, to provide the demodulated real and imaginary components of the signal which is fed to summation circuit 18 at the input of the data detection system and error generation circuitry. As shown in FIG. 3A the heterodyning or mixing process in the demodulator utilizes two input sugnals, both at the bandpass frequency denoted by the two bandpass inputs as fed to exemplary mixer unit 30. The heterodyning process then produces an output signal which is at the baseband frequency and as shown by the baseband output signal from mixer 30.

Figure 4:
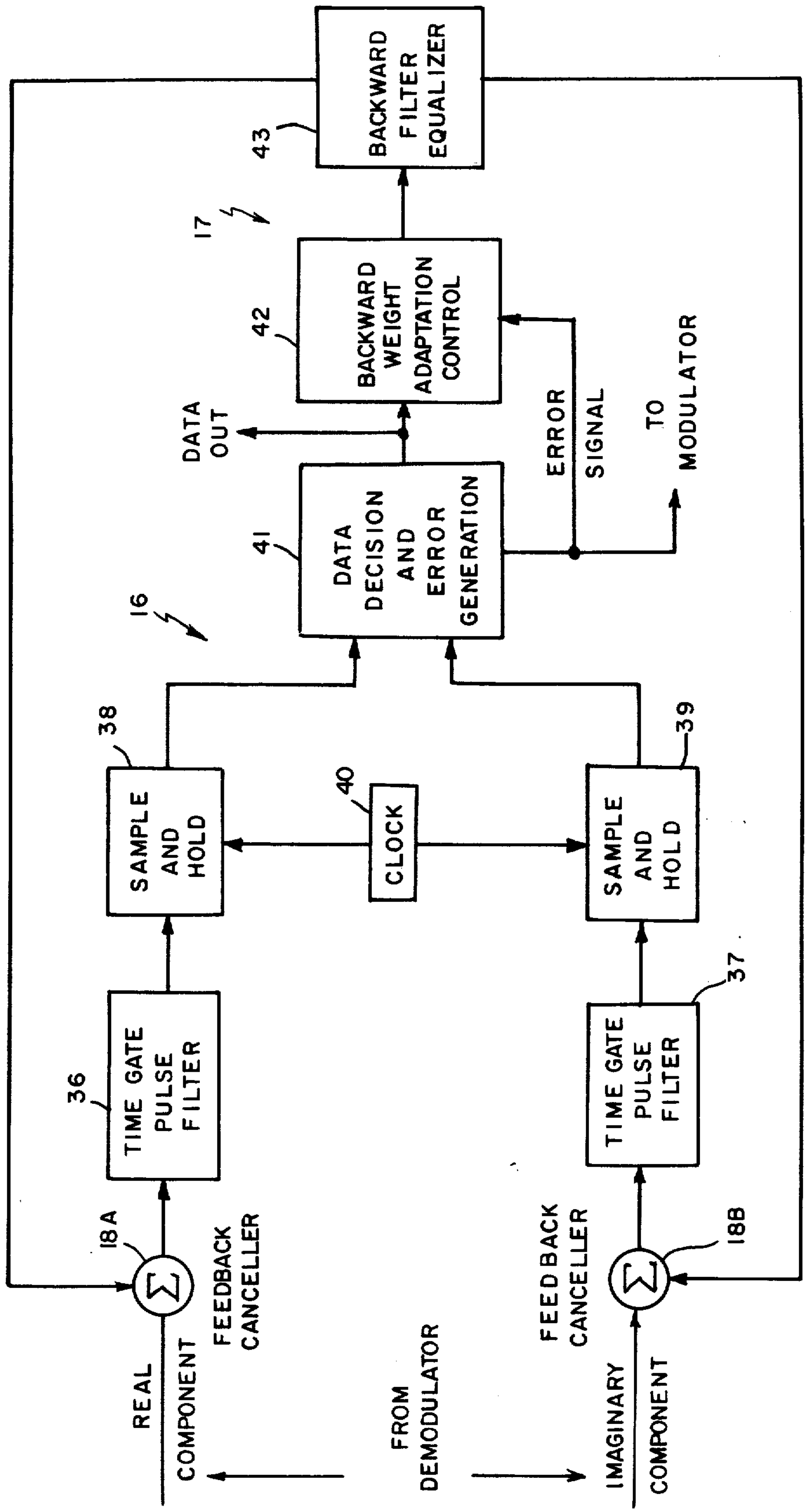
FIG. 4 is a block diagram of the data detector and error generator portion and the feedback filter equalizer portion of the system of FIG. 1.

The data detection system which operates on the demodulated real and imaginary components is shown in FIG. 4, the summation circuit shown diagrammatically in FIG. 1 as circuit 18 being shown more specifically therein as being embodied by two summation circuits 18A and 18B, respectively. Other inputs of each of the summation circuits represent the real and imaginary components of the weighted feedback filter equilizer signals which are used to cancel the intersymbol interference and source correlation effects which are present in the real and imaginary components of the demodulated signal, as discussed in more detail below.

The output of summation circuits 18A and 18B are fed to suitable pulse filters 36 and 37, respectively. The pulse filters appropriately shape the demodulated components so as to match the transmitted pulse. The pulse filters 36 and 37 are typically an approximation to a finite integrator with integrate time equal to the baud length. They provide outputs which can then be sampled at the data symbol interval T through suitable sample and hold circuits 38 and 39 actuated by clock 40. The integrating lengths of pulse filters 36 and 37 are normally equal to the data symbol interval T length but can be arranged in some applications to provide an appropriate time gating of the input signals thereto by arranging the length of the finite integration to be less than the data symbol interval.

The use of such a time gated filter further aids in the elimination of intersymbol interference and permits the use of fewer weighting sections in the backward filter equalizer. Alternatively, passive pulse filters 36 and 37 may be replaced by active integrate and dump circuits, appropriately time gated to integrate over only a part of the data symbol interval, the outputs thereof being fed to the sample and hold circuits 38 and 39.

The sampled signals from circuits 38 and 39 are stored for the data symbol interval time period and fed to the data decision and error generation circuitry discussed in more detail with reference to FIG. 5 which then produces the data output and error signals for weight adaption control.

Figure 5:
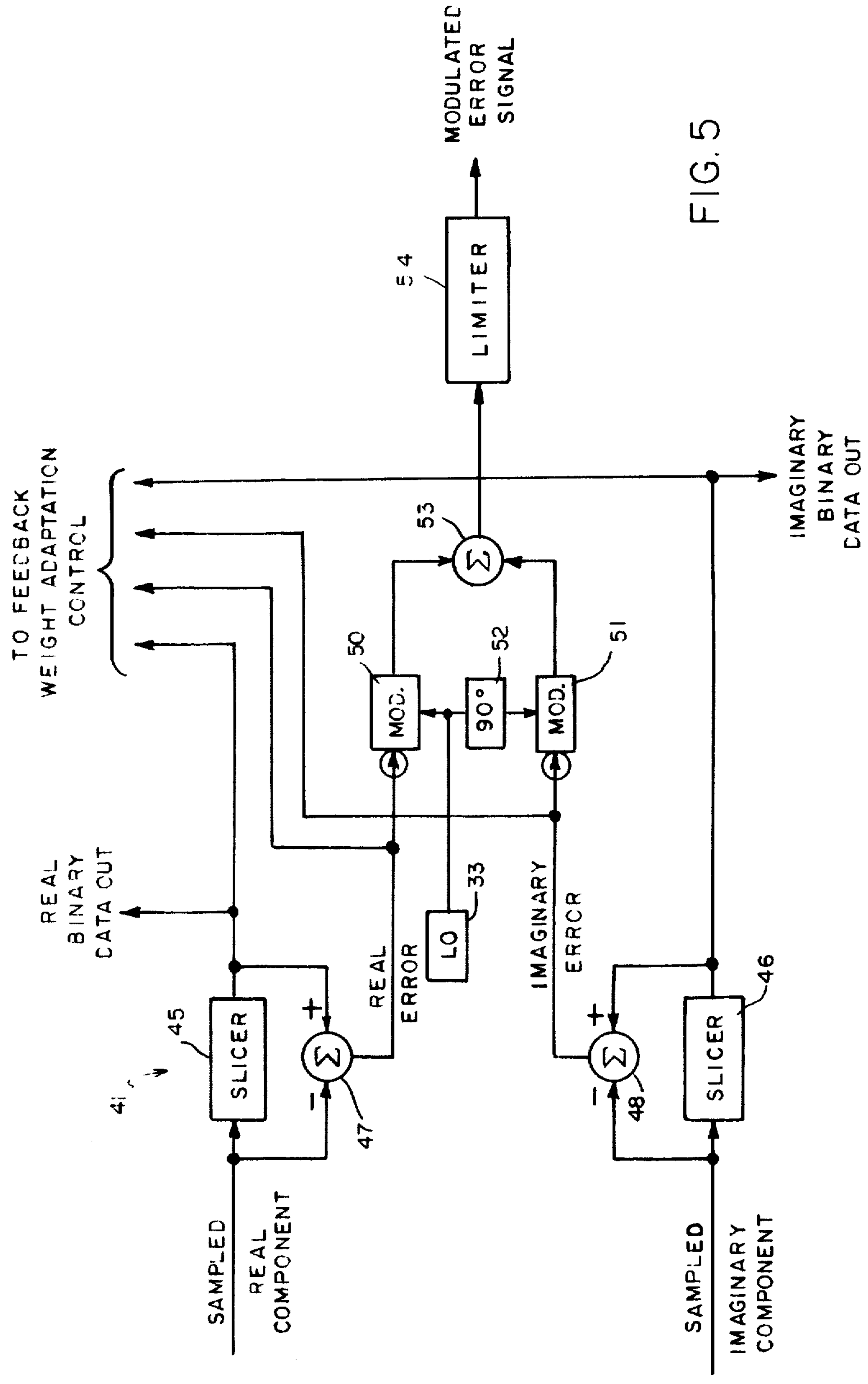
FIG. 5 is a more detailed block diagram of the error generator portion of the system of FIG. 1.

As seen in FIG. 5, the sampled real and imaginary components are fed to slicers 45 and 46, respectively, which are operative to determine the polarity of the sampled component at its input to produce the real and imaginary binary data output signals. The difference between the input and output of each of the slicers is determined by difference amplifier circuitry 47 and 48 to produce the real and imaginary error signals. The real and imaginary error signals at the output of difference circuits 47 and 48 can be fed together with the real and imaginary binary data output signals to the backward weight adaptation control unit 42 for processing thereby as discussed below. The error signal required by the forward weight adaptation control unit must be supplied at the bandpass frequency and is suitably modulated for that purpose. Thus, the real and imaginary error signals are fed to suitable modulators 50 and 51 for modulating a bandpass signal supplied from the local oscillator 33, the latter being supplied directly to modulator 50 and to modulator 51 through a suitable 90° phase shift circuit 52. The outputs of the modulators are summed in combining circuitry 53 and fed to a limiter 54, the output of which supplies the modulated and limited error signal to the forward weight adaptation control unit shown in FIG. 6.

The operation of the demodulator 15 is coherent because the same local oscillator 33 is used to demodulate as is used to obtain the error signal for deriving the optimum filter weights via the forward adaptation control unit. It should be noted that one common modulated and limited error signal is used to adapt all of the weights in each of the predetection combiner filter equalizers, a factor which simplifies greatly the implementation of the adaptation weight control unit as discussed below with reference to FIG. 6.

The forward adaptation weight control signals are obtained as shown in FIG. 6 which depicts one part thereof for obtaining cophasal and quadrature weighting signals $u_{ji}$ and $v_{ji}$, respectively, for the $j$th weighting section of the ith diversity channel. Thus, the modulated and limited error signal is fed to one input of a mixer 56 where it is mixed with the appropriate received signal, identified as $X_{ji}$, which has been fed to the other input of mixer 56 through a suitable time delay network 55 to produce a real heterodyned output signal therefrom. The latter time delay is set at a value which provides alignment of the error signal and the received signal at the mixer and corresponds to the delay in the signal path before data detection. This delay is normally set at the data symbol interval because of the pulse filter operation, or integrate and dump operation, in the detector. The received input signal is also mixed at mixer 58 with the phase-shifted error signal from 90° phase shift network 57 so as to produce an imaginary heterodyned output signal therefrom. The inputs to each of the mixers 56 and 58 are at the bandpass frequencies and, accordingly, each produce output signals at the baseband frequency, such outputs being filtered by appropriate RC filter networks 59 and 60 to form the weighted output signals $u_{ji}$ and $v_{ji}$, the amplitudes of which can be suitably adjusted by variable resistors 61 and 62, respectively. Thus, the weighting signals $u_{ji}$ and $v_{ji}$ are fed as discussed above to the appropriately associated weighting section of the forward transversal filter equalizer of FIG. 2 to produce the weighted output signals therefrom as previously described.

Thus, the adaptation processing is accomplished by the implementation of an IF version of a modified estimated gradient algorithm. Estimated gradient algorithms are described mathematically in the article "Linear estimation in an unknown quasi-stationary environment", P. Monsen, IEEE Transactions on Systems Science and Cybernetics, Vol. SMC-1, No. 3, pp. 216–222, July 1971. The algorithm derives the weighting signals by correlating the appropriately delayed signal input with the limited error signal such algorithm permitting the use of a limited signal rather than an amplitude varying signal. Accordingly, mixers 56 and 58 can be used rather than the multiplier units used in the system of the Brady patent. The use of such mixers eliminates the signal offset problem which arises in the use of the Brady technique. In the latter system the offset present in the multiplier circuit was sufficiently large to preclude operation with more than two or three weights per diversity branch. With the reduction in offset to a negligible value the overall operation is emphatically improved.

Figure 8:
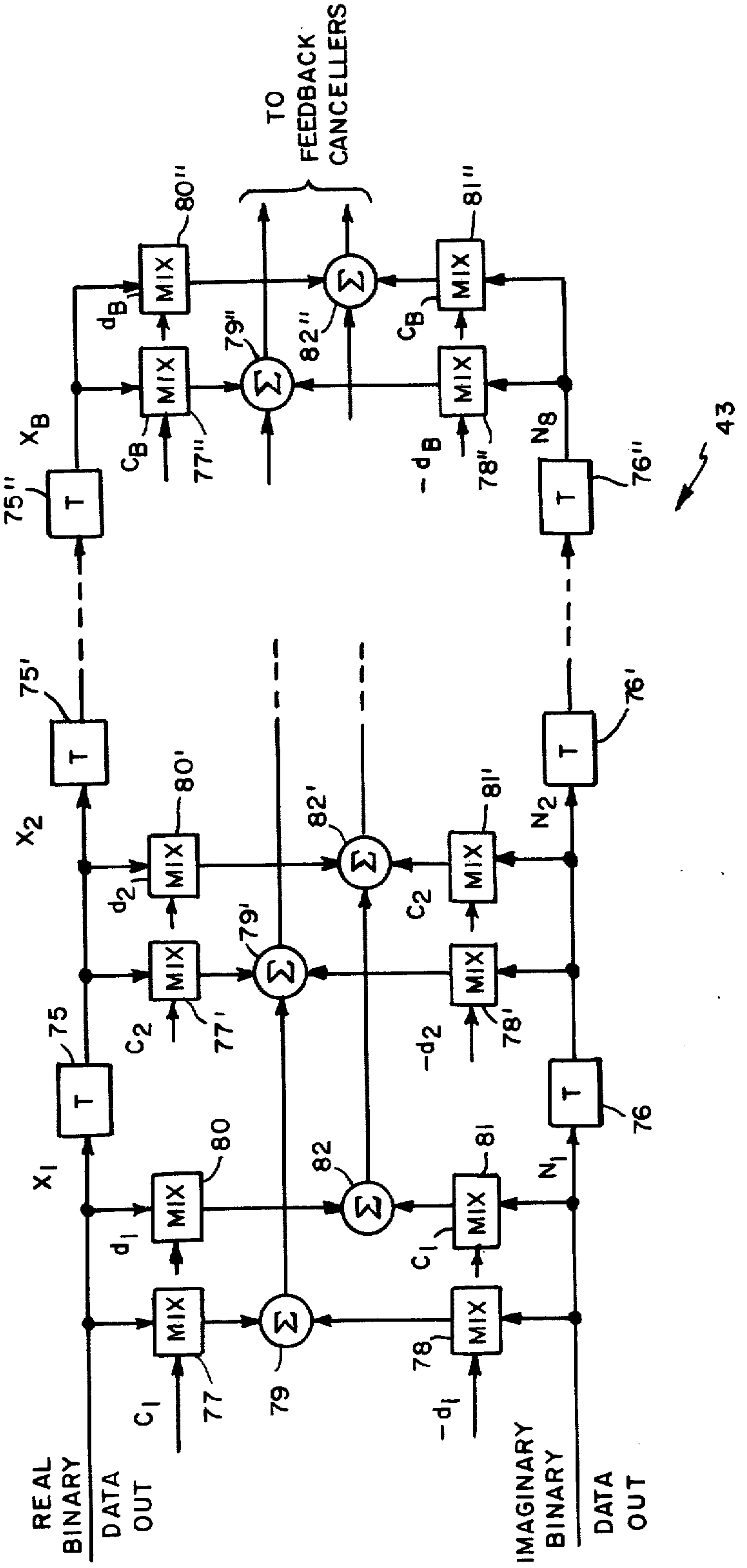
FIG. 8 is a more detailed block diagram of the feedback transversal filter equalizer of the system of FIG. 1.

The operation of the adaptive backward transversal filter equalizer is shown in FIGS. 7 and 8, the former figure depicting the feedback weight adaptation control unit 42 and the latter figure showing the backward filter equalizer unit 43.

As seen in FIG. 7 the real and imaginary binary data output signals $X_i$ and $\eta_i$ in the ith diversity channel are normally delayed by a selected value for the same reasons as discussed above with reference to the delay unit 55 of FIG. 6. The delayed signals are then fed to the inputs of baseband mixers 65, 66, 67 and 68 as shown. The real and imaginary error signals at the baseband frequency are adjusted in amplitude by variable resistors 73 and 74 and then fed to the other inputs of such baseband mixers as shown.

Thus, the real and imaginary binary data signals are, first of all, mixed with the real and imaginary components of the baseband error signal in mixers 65 and 66, the outputs of which are then summed in summation network 69 to produce a first weighting signal $c_i$ after appropriate filtering through a simple RC filter network 71. This adaptation although accomplished at baseband is substantially the same as the forward weight adaptation.

Simultaneously, the real and imaginary data output signals are mixed with the imaginary and real components of the baseband error signal, respectively, in mixers 67 and 68 the outputs of which are summed in summation network 70 to produce weighting signal $d_i$ via RC filter 72. The weighting signals $c_i$ and $d_i$ are then utilized to provide the appropriate weights for the real and imaginary binary data components, i.e., the reconstructed data components, so as to produce the cancellation signal components at the output of backward filter equalizer 43, as discussed below.

Figure 7A:
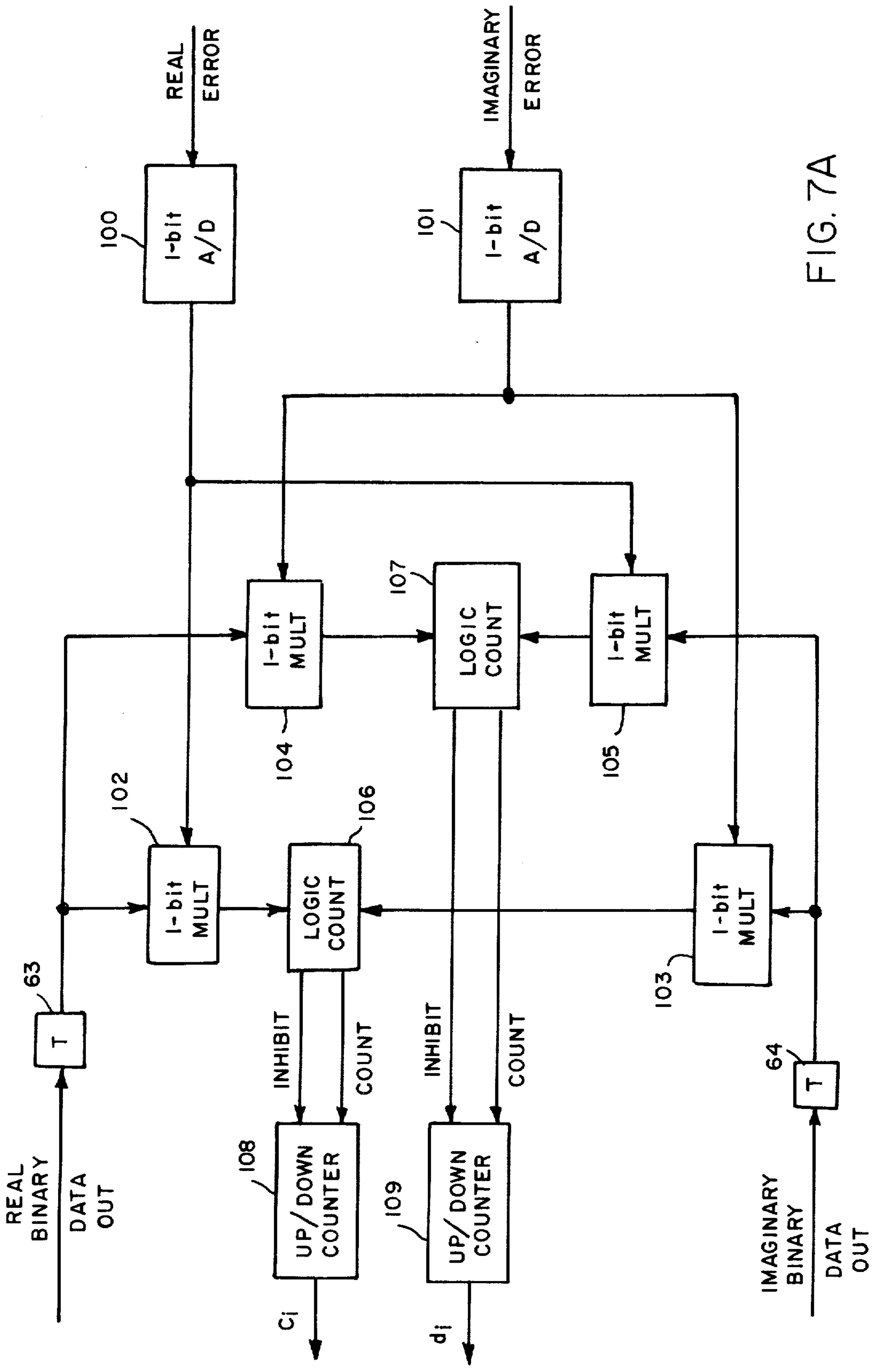
FIG. 7A is an alternative block diagram of the weight adaptation control unit of FIG. 7 which is a digital implementation thereof.

An alternative digital implementation of the adaptation control unit of FIG. 7 is shown in FIG. 7A. As depicted therein the real and imaginary errors are converted from analog to digital form by 1-bit analog to digital (A/D) converters 100 and 101, respectively, the outputs of which effectively represent the sign of the error signal which is thus quantized. The quantized data output components from delay units 63 and 64, which likewise are 1-bit quantizations, and the quantized error components are appropriately combined as shown in 1-bit multipliers 102, 103, 104 and 105 to provide input signals to logic count units 106 and 107. The 1-bit multipliers are the digital equivalents of the mixers shown in FIG. 7 and the logic count units are the digital equivalents of the summation networks therein.

The logic count units provide counting signals to up-down counters 108 and 109 to cause them to count up or count down or an inhibit signal to prevent such units from counting in either direction. Thus, the logic count units provide a "count-up" signal when the sign of the inputs thereto are both positive, a "count-down" signal when the sign of the inputs thereto are both negative, and in inhibit signal when the sign of the inputs thereto are different. The up-down counter is effectively a digital equivalent to the RC circuits of FIG. 7.

FIG. 8 shows the backward filter equalizer circuitry 43 which is effectively similar in construction to that discussed with reference to the forward filter equalizer, i.e., it uses essentially the same adaptation algorithm, except that the weighting sections are spaced by intervals equal to the data symbol interval T and the filter is realized at baseband. The weighting signals $c_i$ and $d_i$ are fed to each weighting section branch to be combined with the real and imaginary reconstructed data output components through suitable baseband mixers. Thus, baseband mixers 77, 78, 80 and 81 are utilized with the undelayed data signal in the first weighting section, mixers 77', 78', 80' and 81' with the T-delay data signal in the second weighting section, and progressively to the final weighting section shown as utilizing mixers 77'', 78'', 80'' and 81''. The outputs of the mixers are appropriately and progressively summed in summation networks 79, 82, 79', 82'. . . 79'', 82'', the latter summations ultimately providing the real and imaginary feedback cancellation components signal which are fed to the feedback cancellation summation networks 18A and 18B of FIG. 4. The cancellation signals eliminate past digit symbol interference and source correlation effects.

For digital operation of the backward filter of FIG. 8 the mixers can be replaced by multipliers, typically 1-bit x 13-bit multipliers, the relatively large number of bit quantization being required on each weighting branch to avoid residual error due to premature algorithm termination. Further, the output signal components of the backward filter supplied to the feedback cancellers each require appropriate digital to analog (D/A) conversion which can be typically accomplished by 6-bit D/A converters.

In accordance with the above described system it can be seen that the deficiencies of the previously described Brady system have not only been overcome but the invention provides an optimized implementation of the broad theoretical concepts discussed in the above mentioned Monsen article. In that article the theoretical feedback equalizer was shown to be superior to the theoretical counterpart of the Brady system. Thus, the invention results in a simpler and less expensive receiver with better performance characteristics than that which can be achieved by the Brady system. The implementation of the forward filter equalizers at a point before demodulation reduces the required number of weighting sections used in the forward filter equalizer circuits. Accordingly, the forward equalizer now requires only three weighted sections in the preferred embodiment described as compared to much greater than three sections needed to achieve satisfactory performance by the Brady system. The forward filter equalizer, being greatly simplified, becomes less expensive to make. Furthermore, an additional implementation performance advantage accrues in that the total adaptation self-noise which is generated by the forward filter equalizers increases with the total number of weighted sections which are used so that the reduced number thereof results in a corresponding reduction in the self-noise margin.

The use of the backward filter equalizer also improves the handling of intersymbol interference. In the invention the forward filter equalizers are utilized to mitigate future digit symbol interference while the backward filter equalizer eliminates past digit symbol interference so that overall performance is improved over systems which use only forward filter equalizers in an attempt to eliminate all digit symbol interference by forward path means.

Moreover, the possible use of time gating in the data detection portion of the system can aid further in the elimination of intersymbol interference in that the timegate will remove a portion of such interference and, accordingly, allow a further reduction in the number of backward transversal filter weighting sections that are required.

Figures 9, 10:
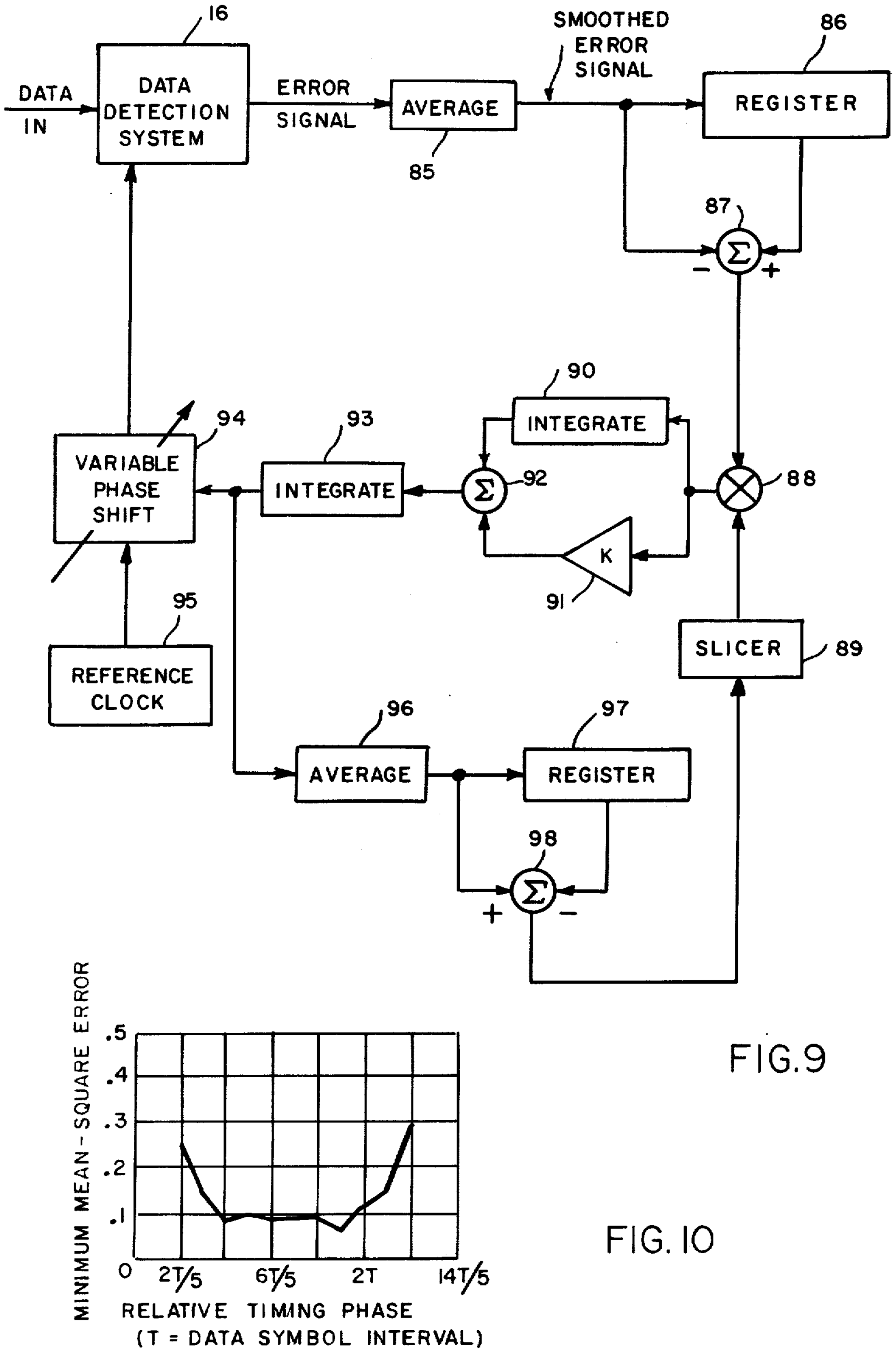
FIG. 9 is a more detailed block diagram of the adaptive timing system of the system shown in FIG. 1.
FIG. 10 is a graph useful in describing the operation of the timing system of FIG. 9.
Figure 11:
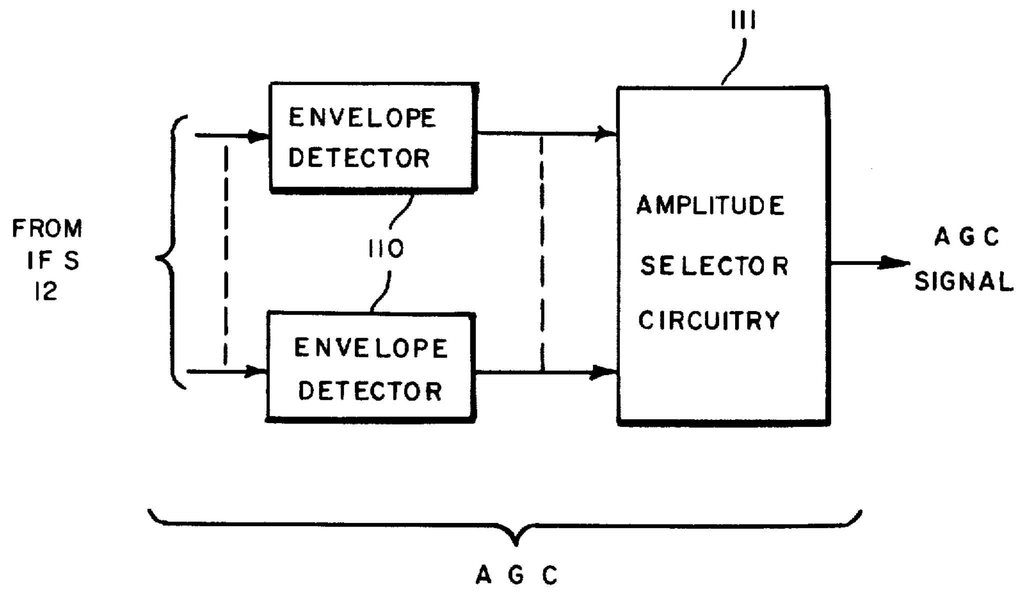

Finally, the invention includes a novel adaptive timing system which permits the receiver clock to follow transmitter clock variations and establish a timing phase which optimizes the overall performance of the system. Such a timing system is not disclosed either in the Brady patent or in the Monsen article. Such a system is depicted in FIG. 9.

The received data has been clocked in the transmitter at a frequency and a phase that are unknown at the receiver. The terminal equipment of the transmitter further filters the transmitted data and the multipath transmission medium further considerably degrades the data transitions by the time they reach the receiver. Thus, any timing synchronization technique which relies on the presence of definable data transitions in the received signals will tend to be inoperative, particularly with long transmission paths and will be considerably degraded even with shorter paths.

Because the forward equalizers in the predetection combiner remove timing jitter, location of the exact transmitter timing phase is not extremely critical in the receiver. In fact a relatively broad optimum exists as a function of receiver timing phase. A typical curve of minimum mean-square error (MMSE) vs. receiver timing phase is given in FIG. 10. While the curve shown therein represents the MMSE in a single diversity channel, a smoothed, or averaged, curve effectively representing all channels can be obtained by averaging the error over a resonable time interval to produce a relatively smooth curve of the same general shape. Since the optimum extends over one data symbol interval, timing jitter up to this amount can be tolerated by the receiver. The sharply rising edges of the curve are a result of falling off the edge of the equalizer. More filter weights would push these edges out. However, the troposcatter channel and clock variations are such that jitter will be significantly less than one data symbol interval in all cases and, thus, three filter weighting sections are judged sufficient for timing jitter removal.

Since the receiver timing phase is not that critical, the timing system is arranged to track the transmitter timing frequency and insure that the timing phase remains within the optimum region of the curve. Because of the bowl-like shape of the timing characteristic (i.e., the MMSE as a function of timing phase), a relatively simplified adaptive method can be used for timing synchronization. Since the MMSE is approximately a convex function of the timing phase, a steepest descent technique can be used to find the minimum point of the curve. The steepest descent technique as used herein is analogous to the use of phase-locked loop implementation. If a second-order phase-locked loop implementation is used, the phase error due to a constant frequency difference is zero. The gradient of the smoothed MMSE curve can be approximated by multiplying the difference between two successive averages of the error by the sign of the phase change. Thus, in FIG. 9 the error signal from the data detection and error generation system 16 is first averaged over a time period long compared to the channel time constant in averaging unit 85 which produces a smoothed error signal which is stored in a storage register 86. Two successive averages of the error signal are fed from the register 86 to the inputs of a difference amplifier 87 to obtain the difference therebetween, which difference represents the magnitude of the derivative, or gradient, of the error signal. The resulting difference is multiplied in multiplier 88 by an appropriate signal representing the sign of the phase change, which sign is obtained at the output of slicer unit 89, the generation of the input thereto being described below. The output of the multiplier 88 is approximately proportional to the derivative of the smoothed error signal with respect to the phase and, thus, a steepest descent adaptation results.

The adaptive timing synchronization system is equivalent to a second order phase-locked loop when integral plus proportional control is used at the input to the voltage controlled oscillator. The preferred implementation thereof in FIG. 9 uses parallel connected integrator circuitry 90 and proportional amplifier circuitry 91 each fed by the appropriately signed difference signal from multiplier 88. The outputs of the two paths are summed at summation circuit 92 and fed to the voltage controlled oscillator which, in the implementation shown, is in the form of an integrator circuit 93 and a phase shift circuit 94 for shifting the place of a reference clock 95 by an amount determined by the output of the integrator circuit 93.

The appropriate sign of the difference signal is obtained by averaging the output of integrator 93 over the data symbol interval in averaging circuitry 96 and obtaining the difference of successively stored averages from register 97 in difference amplifier 98. The output of difference amplifier 98 is fed to the input of slicer circuit 89, the output of which thereby represents the desired sign. The phase shifted output of reference clock 95 is the output adaptive timing signal which can then be used to appropriately time the data detection circuitry 16.

The loop time constants are adjusted to adaptively track the fastest transmitter clock frequency variations. Since a second-order loop is used, a zero steady state phase error will result and a receiver timing phase in the optimum region is guaranteed by the novel adaptive timing system of FIG. 9.

If desired, the adaptive synchronization timing system can be arranged to enter a fast acquisition mode when operator initiated, as by a push button. This mode consists of significantly reducing the loop time constant to pull the loop into the vicinity of the transmitter clock. After a predetermined period, or after the smoothed error falls below a predetermined threshold, the system automatically returns to its normal mode of operation.

Although the novel timing system described above is shown as used with the particular system embodiments described above, it can also be used with any type of receiver that provides an error signal for adaptive equilization purposes, such as the system shown in the Brady patent, for example.

Other modifications of the system of the invention can be made within the spirit and scope thereof.

Thus, the automatic gain control system described above can be used with any receiver which employs adaptive forward filter equalization, whether the filters be positioned to process the received signals prior to or after demodulation.

Further, the backward filter can be implemented at bandpass in generally the same manner as that of the forward filters with the exception that the typical spacing of the weighting sections is at the data symbol interval T. The inputs to the bandpass realization would be modulated versions of the reconstructed data outputs and the error signal.

Further, the cancellation signals from the backward filter may be used at the outputs of filters 36 and 37 rather than at the inputs thereto. The only effect of such a modification on the design is that the time delay in the backward adaptation control circuitry of FIG. 6 must be appropriately set to provide the correct alignment of the data signals and the error signals therein.

In still other modifications, in the analog implementation of the backward filter shown in FIG. 7, resistors 73 and 74 can each be replaced by a slicer and, in the timing system shown in FIG. 9, a slicer can be added between summer 87 and multiplier 88.

Other modifications may occur to those in the art within the scope and spirit of the invention and the invention is not to be deemed limited to the specific embodiments shown and discussed above except as defined by the claims.

What is claimed is:

1. A receiver for processing signals transmitted through a dispersive medium from a transmitter and received in a plurality of diversity channels, said receiver comprising a forward transversal filter equalizer in each of said channels for processing said received signals to produce a combined weighted output signal prior to demodulation, each of said forward filter equalizers including at least one or more weighting sections spaced at not more than the data symbol interval for producing a plurality of weighted signals;

a plurality of weighting means, one for each of said weighting sections, for controlling the weight of the signals processed at each of said weighting sections;

means for combining the weighted signals from each of said weighting sections of all of said forward equalizers to produce a combined weighted output signal;

means for demodulating said combined weighted output signal to produce a demodulated weighted output signal;

means for quantizing said demodulated weighted output signal to produce a quantized data output signal;

means responsive to said quantized data output signal for deriving an unmodulated error signal;

means for modulating said error signal; and means for processing said modulated error signal and said received signals to produce control signals for controlling the weights operative at each weighting section of each of said equalizers.

2. A receiver in accordance with claim 1 and further including means for limiting said modulated error signal to supply a limited modulated error signal to said processing means.

3. A receiver in accordance with claim 1 and further including time gating means for producing a gating signal having a time interval less than the data symbol interval; and said quantizing means being responsive to said gating signs for processing said weighted output signal over said time interval.

4. A receiver in accordance with claim 1 and further including amplifying means in each of said diversity channels, each being responsive to the received signal in said channel; and automatic gain control means responsive to the amplified signals in each of said channels for providing a common gain control signal to each of said amplifying means to control the gain in each said amplifying means in accordance with the received signal having the greatest amplitude.

5. A receiver in accordance with claim 4 wherein said automatic gain control means includes a plurality of envelope detecting means, each responsive to the amplified signal from one of said amplifying means to produce a plurality of envelope detected signals; and means for comparing the amplitudes of said envelope detected signals and selecting the envelope detected signal having the greatest amplitude to produce said common gain control signal.

6. A receiver in accordance with claim 1 and further including a backward transversal filter equalizer for processing said quantized data output signal to produce a feedback cancellation signal, said backward filter equalizer comprising a plurality of weighting sections spaced at not more than the data symbol interval for providing a plurality of weighted signals;

a plurality of weighting means, one for each of said weighting sections, for controlling the weights of the signals processed at each of said weighting sections;

means for combining the weighted outputs from each of said weighting sections to produce a weighted feedback cancellation signal;

means for combining said cancellation signal with said demodulated weighted output signal to eliminate intersymbol interference and source correlation effects from said demodulated weighted output signal; and means for processing said error signal and said quantized data output signal to produce feedback control signals for controlling the weights operative at each said weighting section of said backward filter equalizer.

7. A receiver in accordance with claim 6 and further including amplifying means in each of said diversity channels, each being responsive to the received signal in said channel; and automatic gain control means responsive to the amplified signals in each of said channels for providing a common gain control signal to each of said amplifying means to control the gain in each said amplifying means in accordance with the received signal having the greatest amplitude.

8. A receiver in accordance with claim 6 and further including time gating means for producing a gating signal having a time interval less than the data symbol interval; and said quantizing means being responsive to said gating signal for processing said weighted output signal over said time interval.

9. A receiver in accordance with claim 6 and further including adaptive timing means for establishing a timing signal the phase of which varies in accordance with timing variations in the received signal arising because of variations in the timing system of the transmitter which generates said received signals.

10. A receiver in accordance with claim 6 wherein said unmodulated error signal and said quantized data output signal each have cophased and quadrature components and said feedback control signals producing means comprises means for mixing the cophasal and quadrature components of said error signal with the cophasal and quadrature components of said quantized data output signal to produce a plurality of mixed signals;

means for combining said mixed signals to produce said feedback control signals for controlling the weights operative at each said weighting section of said backward filter equalizer.

11. A receiver in accordacne with claim 10 and further including means for adjusting the amplitudes of the cophasal and quadrature components of said unmodulated error signal.

12. A receiver in accordance with claim 11 and further including means for filtering said combined mixed signals to provide smoothed feedback control signals.

13. A receiver in accordance with claim 10 and further including means for delaying the cophasal and quadrature components of said data output signal supplied to each of said mixers by a preselected amount to provide for correct alignment of said error components with said data output signal components at each of said mixers.

14. A receiver in accordance with claim 6 wherein said modulated error signal processing means comprises means for mixing said modulated error signal with the received signal at each of said weighting sections in each of said forward equalizers to produce mixed signals having cophasal and quadrature components.

15. A receiver in accordance with claim 14 said weighting means including means for filtering and adjusting the amplitudes of said mixed signals to produce a control signal having cophasal and quadrature components for controlling the weights of the cophasal and quadrature components of the received signal in each of said weighting sections.

16. A receiver in accordance with claim 15 and further including means for delaying the received signal supplied to each of said mixers by a preselected amount to provide for correct alignment of said error signal with said received signal at each of said mixers.

17. A receiver in accordance with claim 16 wherein said weighting means comprises modulator means in each of said weighting sections responsive to the control signal components supplied to said section and to the cophasal and quadrature components of the corresponding received signal in said section, said received signals being bandpass signals and said control signals being baseband signals, said modulating means modulating said received signal components with the said control signal components to produce said weighted signal having cophasal and quadrature components.

18. A receiver in accordance with claim 1 and further including adaptive timing means for establishing a timing signal the phase of which varies in accordance with timing variations in the received signal arising because of variations in the timing system of the transmitter which generates said received signals.

19. A receiver in accordance with claim 18 wherein said receiver is provided with a clock signal and said adaptive timing system comprises averaging means responsive to said unmodulated error signal for providing a signal representing the average of said unmodulated error signal over a time period which is longer than the time constant of said diversity channels;

means for producing a difference signal effectively representing the derivative of said averaged error signals;

control means responsive to said difference signal to produce a phase control signal;

means responsive to said clock signal and to said phase control signal for shifting the phase of said clock signal to produce an adaptively controlled timing signal.

20. A receiver in accordance with claim 19 wherein said control means includes a first parallel path for providing a first signal which is the integral of said difference signal;

a second parallel path for providing a second signal which is proportional to said difference signal;

means for combining said first and second signals; and means responsive to said combined signal for providing said phase control signal.

21. A receiver in accordance with claim 20 and further including means responsive to said phase control signal for providing a signal which determines the sign of said difference signal; and means responsive to said sign determining signal and to said difference signal producing a difference signal having a correctly determined sign.

22. A receiver for processing signals transmitted through a dispersive medium from a transmitter and received in a plurality of diversity channels, said receiver comprising a forward transversal filter equalizer in each of said channels for processing said received signals to produce a combined weighted output signal, each of said forward filter equalizers including at least one or more weighting sections spaced at not more than the data symbol interval for producing a plurality of weighted signals;

a plurality of weighting means, one for each of said weighting sections, for controlling the weight of the signals processed at each of said weighting sections;

means for combining the weighted signals from each of said weighting sections of all of said forward equalizers to produce a combined weighted output signal;

means for quantizing said combined weighted output signal to produce a quantized data output signal;

means responsive to said quantized data output signal for deriving an error signal;

means for processing said error signal and said received signals to produce control signals for controlling the weights operative at each weighting section of each of said equalizers;

amplifying means in each of said diversity channels, each being responsive to the received signal in said channel; and automatic gain control means responsive to the amplified signals in each of said channels for providing a common gain control signal to each of said amplifying means to control the gain in each said amplifying means in accordance with the received signal having the greatest amplitude.

23. A receiver for processing signals transmitted through a dispersive medium from a transmitter and received in a plurality of diversity channels, said receiver comprising a forward transversal filter equalizer in each of said channels for processing said received signals to produce a combined weighted output signal, each of said forward filter equalizers including at least one or more weighting sections spaced at not more than the data symbol interval for producing a plurality of weighted signals;

a plurality of weighting means, one for each of said weighting sections, for controlling the weight of the signals processed at each of said weighting sections;

means for combining the weighted signals from each of said weighting sections of all of said forward equalizers to produce a combined weighted output signal;

means for quantizing said combined weighting output signal to produce a quantized data output signal;

means responsive to said quantized data output signal for deriving an error signal;

means for processing said error signal and said received signals to produce control signals for controlling the weights operative at each weighting section of each of said equalizers; and adaptive timing means for establishing a timing signal the phase of which varies in accordance with the timing variations in the received signals arising because of variations in the timing system of the transmitter which generates said received signals.

* * * * *